United States Patent [19]

Des Ormeaux

[11] Patent Number: 5,250,175

[45] Date of Patent: Oct. 5, 1993

[54] PROCESS FOR RECOVERY AND TREATMENT OF HAZARDOUS AND NON-HAZARDOUS COMPONENTS FROM A WASTE STREAM

[75] Inventor: Thomas F. Des Ormeaux, Houston, Tex.

[73] Assignee: Seaview Thermal Systems, Blue Bell, Pa.

[21] Appl. No.: 443,584

[22] Filed: Nov. 29, 1989

[51] Int. Cl.⁵ .............................................. B01D 3/34
[52] U.S. Cl. ................................. 208/356; 208/363; 208/364; 208/366; 208/369; 208/400; 208/407; 208/13; 588/228; 588/230
[58] Field of Search ............... 208/400, 407, 364, 356; 201/31, 41; 196/104, 120, 155; 585/240; 588/228, 230

[56] References Cited

U.S. PATENT DOCUMENTS

| | | | |
|---|---|---|---|
| 1,520,161 | 12/1924 | Tilburg | 208/364 |
| 1,568,886 | 1/1926 | Duckham et al. | 208/364 |
| 1,606,075 | 11/1926 | Howard | 208/364 |
| 1,868,466 | 7/1932 | Leslie | 208/364 |
| 1,873,135 | 8/1932 | Laud | 208/364 |
| 2,095,863 | 10/1934 | Freeman | 208/364 |
| 2,443,970 | 6/1948 | Waddell | 208/364 |
| 2,912,941 | 11/1959 | Hughes et al. | |
| 3,109,781 | 11/1963 | Natland | 208/400 |
| 3,648,630 | 3/1972 | Hobbs et al. | |
| 3,668,077 | 6/1972 | Ban | |
| 3,771,468 | 11/1973 | Kelly | |
| 3,855,950 | 12/1974 | Hughes et al. | |
| 3,918,374 | 11/1975 | Yamamoto et al. | |
| 4,056,461 | 11/1977 | Unverfetth | 208/407 |
| 4,058,905 | 11/1977 | Knight | 208/407 |
| 4,080,196 | 3/1978 | Gold | |
| 4,133,741 | 1/1979 | Weichman et al. | 208/407 |
| 4,170,183 | 10/1979 | Cross | |
| 4,320,709 | 3/1982 | Hladun | |
| 4,361,100 | 11/1982 | Hinger | |
| 4,372,226 | 2/1983 | Erlandsson | |
| 4,388,875 | 6/1983 | Hirose | |
| 4,398,475 | 8/1983 | McKiel, Jr. | |
| 4,399,756 | 8/1983 | Lientz | |
| 4,412,909 | 11/1983 | Faulkner | 208/407 |
| 4,456,525 | 6/1984 | Spurs et al. | 208/400 |
| 4,462,318 | 7/1984 | Carbeau et al. | |
| 4,520,741 | 6/1985 | Carbeau et al. | |
| 4,606,774 | 8/1986 | Morris | 588/228 |
| 4,667,609 | 5/1987 | Hardison et al. | |
| 4,679,268 | 7/1987 | Gurries et al. | |
| 4,696,734 | 9/1987 | Gentry | 208/407 |
| 4,699,721 | 10/1987 | Meenan et al. | |
| 4,726,301 | 2/1988 | Des Ormeaux et al. | 110/250 |
| 4,739,714 | 4/1988 | LaSpisa et al. | |
| 4,740,127 | 4/1988 | Galgana et al. | |
| 4,750,437 | 6/1988 | Rousse | |
| 4,758,331 | 7/1988 | Kruse et al. | 208/407 |
| 4,759,300 | 7/1988 | Hanson et al. | |
| 4,778,606 | 10/1988 | Meenan et al. | |
| 4,793,937 | 12/1988 | Meenan et al. | |
| 4,802,424 | 2/1989 | McGinnis, III et al. | |
| 4,843,979 | 7/1989 | Phillips | |
| 4,869,810 | 9/1989 | Ellingsen et al. | 208/400 |

*Primary Examiner*—Helane Myers
*Attorney, Agent, or Firm*—Pravel, Hewitt, Kimball & Krieger

[57] ABSTRACT

A process for removing and recovering specific constituents from a waste stream at higher temperatures than the boiling point of the specific constituents. In the process, the waste is moved at a specified retention time, through a heat zone, thus increasing the temperature of the waste stream. There is further provided a means to separate certain components in that waste stream whereby the components are evaporated and are released in a gaseous state, either from a liquid or a solid within the waste stream. The gaseous components are then transferred in the gaseous state through a flow of an inert medium, such as nitrogen gas, to inhibit combustion of the components, or to prevent the combination of oxidation, or oxygen being used as a catalyst to form even more hazardous compounds. The gaseous components then are released in a distilled state, which would then be mixed with the waste, or an emulsion with the waste stream, containing heavy metal such as cadmium, arsenic, lead, or some other type of heavy metal which may be a threat to the environment.

19 Claims, 3 Drawing Sheets

PROCESS FOR RECOVERY AND TREATMENT OF HAZARDOUS AND NON-HAZARDOUS COMPONENTS FROM A WASTE STREAM

BACKGROUND OF THE INVENTION

1. Field of the Invention

The process of the present invention relates to treatment of hazardous and non-hazardous waste. More particularly, the present invention relates to a process for treating a waste stream containing hazardous and non-hazardous components, through increasing the temperature of the waste stream over a given period of time to desirable temperatures, so as to reduce the stream to a liquid and gaseous state, so that various components can be removed from the stream at particular temperatures, and may be condensed for storage.

2. General Background

In various industries such as the oil and gas industry, oil and gas refinery production, and chemical manufacturing industries, which, through their operation, produce waste stream of materials utilized in the industry, there is an ever increasing problem of the treatment of these waste streams in order to properly dispose of components which are harmful to the environment, and in order to recover components which may be useful when recovered. The Environmental Protection Agency, through their guidelines, have characterized waste as either hazardous waste Class 1, or non-hazardous waste Class 2.

For example, in the field of refining oil and natural gas, as well as the condensate, which is recovered during the process of refining the waste stream, there are certain components of the waste stream which cannot be refined or processed, and which are then stored in large pits and may cause possible environment problems in the future due to the process of leaking into the water table adjacent the pits. In fact, most petro-chemical waste involved heavily ladened volatile organic compounds (or oil), which is an emulsion with the inert earth and other chemical compounds which become hazardous to the environment particularly from emissions through evaporation or from leakage through soil and going into the drinking water.

Other industries have confronted the problem of heavy metals contained in the waste stream, such as cadmium, arsenic, or lead, which become a serious threat to our environment as attempts are made to dispose of these wastes under proper environmental guidelines.

Heretofore, there has not been a process which could properly treat a waste stream, wherein the stream is subjected to various degrees of heat, over certain period of times, so that the components in the stream are volatized at particular temperatures, and may then be recondensed into a recoverable and reusable component, or may be condensed as a hazardous material which must be placed in storage and moved as a source of harm to the environment. The process of the present invention addresses a new and improved method of treatment of such a waste stream, which solves the problems that are being confronted in the present state of the art.

It is known in the art that there is provided a conveyor system for moving oil well cuttings through a chamber wherein the cuttings are fired by flames in order to drive them into the ashen state and thus be removed as dry cuttings or dry waste. The shortcoming of this particular apparatus when the open flame or oxidation occurs near the cite of the borehole creates an extremely hazardous situation. Furthermore, and perhaps even worse, the oxidation process can actually serve as a catalyst to form chemical compounds, thus not in-line with the separation process in reducing the waste, but in line with a now rejoining process of chemical catalyst of oxidation during the process of oxidizing or the incineration process.

Several patents have been granted to the present inventor, which cover the incineration of oil well cuttings during waste recovery.

U.S. Pat. No. 4,606,283, entitled "A System For Extracting Contaminants And Hydrocarbons From Cutting Waste In Oil Well Drilling", relate to the incineration of oil well cuttings through the use of laterally disposed augers where the cuttings are incinerated prior to being placed into waste containers.

U.S. Pat. No. 4,726,301, entitled "A System For Extracting Contaminants And Hydrocarbons From Cutting Waste In Oil Well Drilling", also relates to an improvement of the process in the '283 patent, in that the gas released from the incineration process is passed through a heat exchanger, in order to recondense some of the gaseous waste, rather than release the waste to atmosphere.

Furthermore, there are several applications pending, by the same inventor, which relate to further refinements of the system, i.e., the use of a system to condense the gaseous waste, so that the oil contained in the vapors may be separated from any water and collected for use, and the second application which relates to the use of a non-toxic and inert gas medium during the process of burning the waste, so that no incineration takes place, and the wastes are dried in a relatively non-combustion free atmosphere.

However, it is suggested with the present invention, that the systems used in U.S. Pat. Nos. 4,606,283, and 4,726,301, can additionally be used for refining, production, and transportation of waste in the petro-chemical industry, together with other industries. Due to innovative technological advancements which are recited in this application, the technology can now be utilized to separate hazardous waste being classified under the Superfund by the U.S. Environmental Protection Agency, and to reduce the actual waste, thereby making it economical and more feasible to manage.

SUMMARY OF THE PRESENT INVENTION

The process of the present invention can be utilized in the treatment of hazardous and non-hazardous waste in a straightforward manner. What is provided is a process for conveying waste material from room temperature to a higher temperature of the boiling point of chemicals and inert materials forming ninety (90%) percent of the waste stream in the United States. In the process, the waste is moved at a specified rate and at a range of retention times that are influenced by the nature and quantity of components, through a heat zone, thus increasing the temperature of the waste stream. There is further provided a means to separate certain components in that waste stream at their boiling point temperature, whereby the components evaporate and are released in a gaseous state, either from a liquid or a solid within the waste stream. The gaseous components are then transferred in the gaseous state through a flow of an inert medium, such as nitrogen gas or carbon dioxide, to inhibit combustion of the components, or to prevent the combination of oxidation, or oxygen being used as a catalyst to form even more hazardous compounds. The gaseous components then are released in a distilled state, which would then be mixed with the waste, or an emulsion with the waste stream, containing heavy metal such as cadmium, arsenic, lead, or some other type of heavy metal which may be a threat to the environment.

The process provides a means for heating a cylindrical container, such as the type found in U.S. Pat. No. 4,606,283, and incorporated hereinto by reference thereinto, wherein there is provided a means for controlling the speed of an auger contained within the chamber, so that the waste material contained in the chamber, reaches a specific temperature, while being conveyed through the chamber, so that this material may become a gas or the like. The gas is transported through a piping structure where the inert medium, such as nitrogen, will cause the gas transferred to be cooled into a liquid or solid, and then can be isolated into a storage tank. Those components which are not released in the initial passage through the chamber, would then be gravity fed into a second cylindrical chamber where the waste is now exposed to higher temperature, and for again a certain pre-determined amount of time, so that other components such as light hydrocarbons are rendered into a vapor state, and then recondensing or distilling that component and storing the light vapors in a separate storage tank, again through the use of the neutral medium such as nitrogen.

Further, the waste stream is then gravity fed into a third stage of the process, wherein the auger will move the waste material through the apparatus, thereby increasing the temperature and releasing further volatile organic chemicals or inert materials which have boiling points at that temperature, and separating those liquids or solids that turn to gases. This process is repeated until all of the compounds which are evaporated and recondensed at various temperatures are removed from the waste stream, and the stream is then non-hazardous, which may be disposed of in the environment.

However, through the entire process, the inert gas flow is the transportation vehicle in which the liquid vapor is then carried, with the dry inert gas or gases are flowing through the system and blanketing the entire system. This serves two purposes. It provides a dry gas which will absorb or will actually transport the vapor from the heated cylinder to the condensing and separation storage tank of that specific chamber. Second, it serves as a deactivator of any oxygen exposed to the temperature and the chemicals or volatile organic compounds, thus presently the oxidation or cracking process in which fire or incineration, or pyrolyses. The nitrogen being present does not cause oxidation, thereby eliminates the additions of other elements. The separation process uses a series of heated chambers whereby, through the increased temperature of each chamber as the material flows, the material is moved laterally through the chamber with the auger system, gravity fed down to the following chamber, but carrying with it the heat within it to be increased to a higher level. Thus, more and more of the compounds are released as it goes down thus cleaning temperature the inert material, which is normally earth, and allowing it to go back into the environment without having detrimental effects on the ecology.

Further, in principal rather than having one cylinder which may be five hundred feet long (500') it could be more structurally and thermodynamically effective to provide ten (10) cylinders fifty feet long (50') each, one on top of the other continually graduating to a higher temperature and having the material graduate to a higher temperature.

Also, because the chambers are sitting virtually directly on top of one another, the heat chambers in the process that would take less ground space, thereby not being restricted to areas where say the amount of space requirement is critical.

Each and every heat chamber is separate in that the feed of the electrical power to that chamber is separated from the remainder of the feed to the other electrical chambers which create the heat. Also, the hydraulic feed, conveying the material by auger to the next auger is completely separate from all of the other chambers as well. For example, chamber number one could be set for a desired temperature and residence time, chamber number two for a higher temperature and shorter (or equal) residence time and chamber number three set for highest temperature and shortest residence time. This is simply a matter of setting the computer control of the auger in revolutions per minute thereby either increasing or decreasing the length of time that the material or waste is exposed to a certain temperature which is an independent variable from the operating temperature. Thus, being totally separate from one another allows the variability or the variety of waste or compounds of waste which may be exposed to be specifically handled for a specific application. This enables a variety of applications, because of the variation of the retention time being handled by a changing of the revolutions per minute through the hydraulic feed process and the heat being able to be increased or decreased to the tenth of a degree and controlled within each particular and separate chamber.

Also, the inert gas producing system, whether it be an on-site transported nitrogen feed, is a dry inert gas which does not have any, or very little, oxygen in it, thereby not allowing the oxidation process to take place. It would normally take place at temperatures at the levels under which the apparatus works. It is simply a suffocation process to where the apparatus cannot create any type of oxidation or flash since there is no oxygen present during the apparatus's processing time.

Also, the inert gas serves as a very good transporting agent or carrying agent. The specific relative humidity or liquid within the inert gas is very low thereby able to contain more of a carrying capacity for a liquid vapor. It is able to transport, through a flow of the inert gas in a system, and to direct the flow of this vapor to a separate cooling, condensing and then storage tank.

These and other objects of this invention will be readily apparent to those skilled in the art from the detailed description and claims which follow.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and within.

DETAILED DESCRIPTION OF THE PREFERRED EMBODIMENT

In the preferred embodiment of the system of the present invention, the system provides a process for treatment of hazardous waste in an inert atmosphere. In this process, hazardous and non-hazardous waste components are introduced into a heating chamber, such as the type found in U.S. Pat. No. 4,606,283, which is incorporated hereinto by reference, wherein there is provided a means for controlling the speed of an auger contained within the chamber, so that the waste material contained in the chamber may reach a specific temperature, for a specific duration of time, while being conveyed to the chamber. Initially, the material in the chamber is increased in temperature. As the material is heated, an inert or carbon dioxide gas, such as nitrogen or carbon dioxide gas, and steam, would be utilized to sweep the material and remove and separate the volatile compounds. The inert gas and steam can carry only a certain quantity of the volatile compound before it becomes saturated. By providing the step of "sweeping" with fresh inert gas and steam, the volatile compounds can be removed and the inert gas and steam filled with fresh volatile compounds. These compounds, are referenced in the table attached as Table A to the application, and represents a partial list of the compounds, and the system may have the capability of removing other volatile compounds. Following the removal of the volatile compounds for the inert gas and steam sweep, the resulting affluence of the process would be water, oil, and dry granular, inert solids, such as dirt, clay, small rocks, that would be less than one inch in diameter, and would not be burned off or oxidized through the process. Furthermore, in addition to the inert solid compounds, which are not volatized, the volatile compounds which are removed through the "sweeping" step, are not oxidized either, because the system sweeps the waste material in the chamber with an inert gas, and therefore excludes the necessary component of oxygen gas which would result in oxidation if ignited.

The examples of volatile hydrocarbons would be those hydrocarbons which boil at a relatively low temperature, such as gasoline, and the semi-volatile hydrocarbons would be the hydrocarbons which burn at a high temperature, for example tar.

Figure 1:
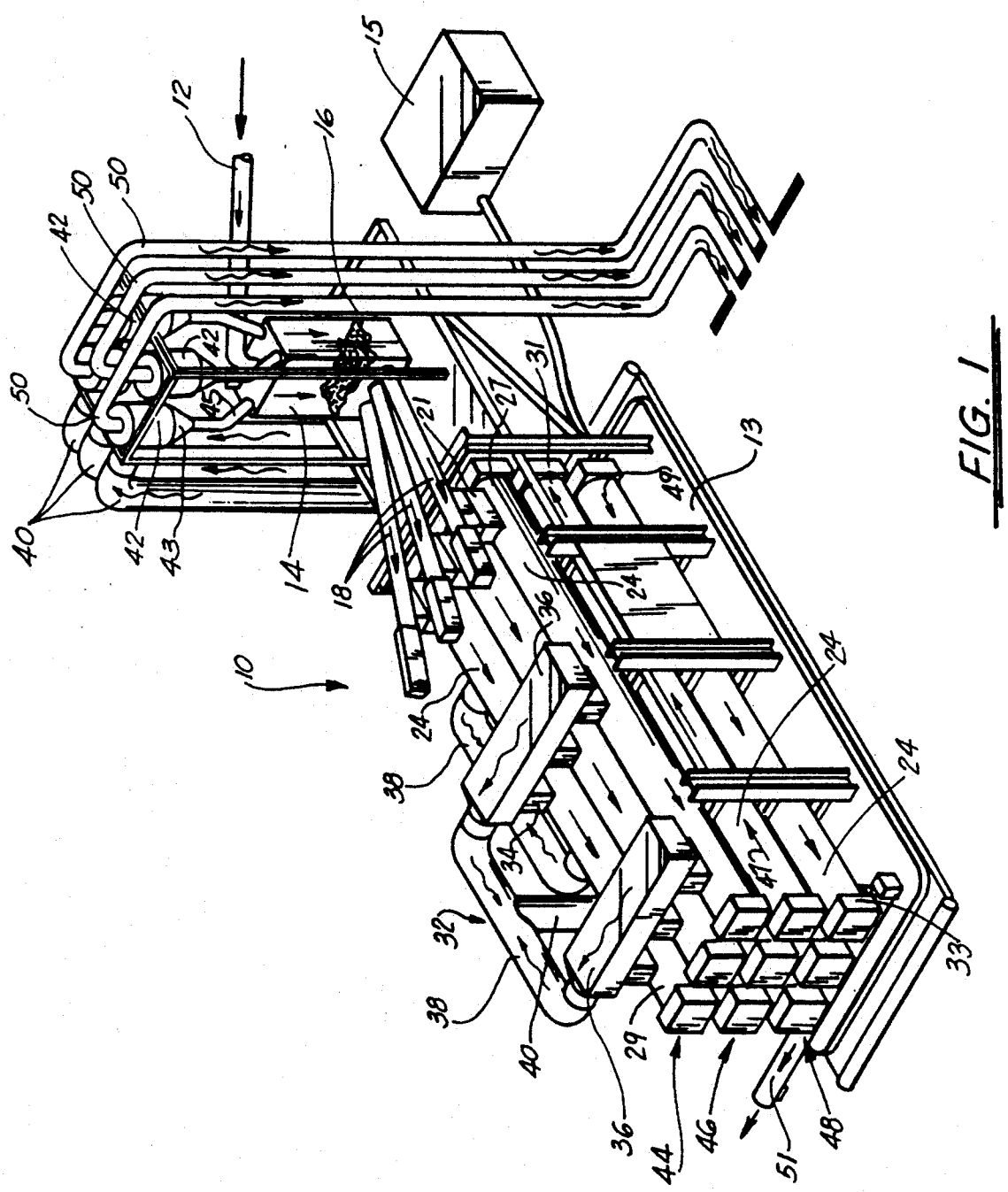
FIG. 1 is an overall view of the preferred embodiment of the heating chamber assembly in the preferred embodiment of the system of the present invention.

Overall, the process, in the preferred embodiment, would utilize a distillation train comprising of three sets of three paths of heating chambers operating in parallel (see FIG. 1). In the operation of the system, contaminated waste, as stated earlier, would be heated in three different temperature zones.

Figure 3:
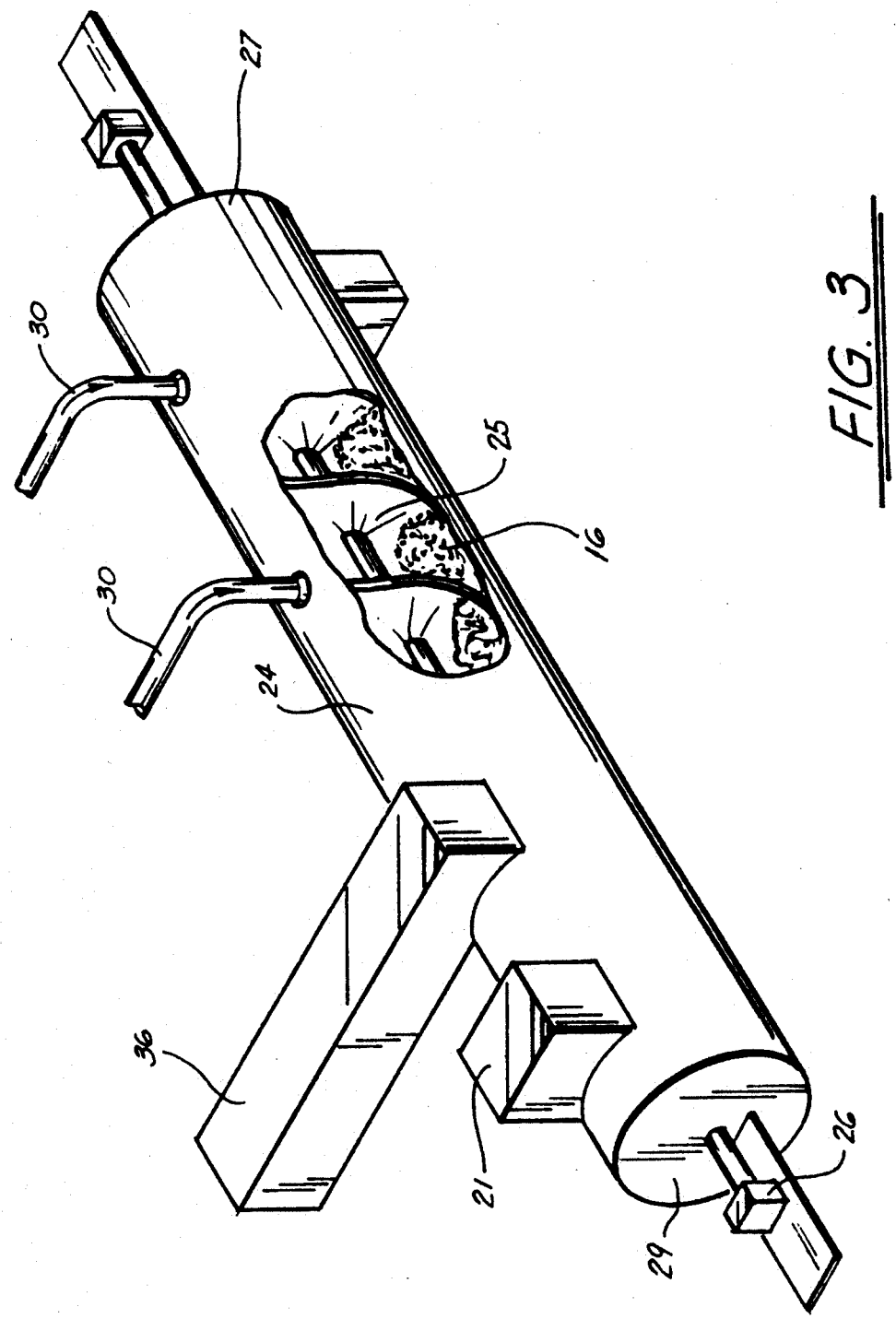
FIG. 3 is an isolated partial cut-away of one of the heating chambers in the heating chamber portion of the preferred embodiment of the system of the present invention.

In the preferred embodiment, as illustrated in FIG. 1, the overall system of the present invention is illustrated by the numeral 10. As illustrated, system 10 would include a first feed pipe 12 which would be utilized to introduce volatile or semi-volatile compounds from large quantities of inert compounds such as dirt, clay, rocks, sand, or drilling mud. For purposes of description in this Specification, the waste materials will be designated as oilfield waste, since this is foreseen as a principal use of the present system. Feed line 12 would feed the oilfield waste into a feed hopper 14, which would be a four wall container for containing the waste material as they are fed into the system. The waste materials 16, as seen in FIG. 1, would then be conveyed via a plurality of feed augers 18, each of which would convey the waste material through auger 18 and deposit the waste via chute 21 into three horizontally disposed heating chambers 24 of the type that were disclosed and claimed in U.S. Pat. No. 4,606,283, which has been incorporated by reference thereto. Each of the heating chambers 24, as disclosed in the '283 patent, would include an auger 25, (see FIG. 3), turned by motor 26 which would convey the material from the first end 27 of each of the augers 24 to the second end 29 and the waste materials would be heated preferrably to a temperature optimumly between 212° F. to 350° F., which would vaporize water and light hydrocarbons, which boil off at low temperatures, or in this case, less than 212° F., the boiling point of water. As if further illustrated, in order to prevent inadvertent ignition of any volatile compounds during the heating process through chambers 24, there is provided a pair of inert gas feeds 30 (see FIG. 3), each of the feeds 30 injecting inert gas of each of the heating chambers. For purposes of definition, the inert gases that may be introduced into the chamber are nitrogen or carbon dioxide, or any other inert gas which may be utilized to prevent ignition of hydrocarbon vapors in the chambers.

As illustrated, there is further provided an exhaust means 32 for exhausting vapors out of each of the chambers. The exhaust means comprises an exhaust line 34 receiving vapors from each of the chambers, 24, and moving the chambers into an exhaust manifold 36. In the preferred embodiment there is illustrated, a pair of exhaust manifolds for receiving the volatile vapors, with the vapors moving from the manifold into a vapor line 38, wherein the vapors would then be conveyed through a main vapor line 40 for feeding the vapors into a cyclone separator 42, the function of which will be discussed further. As seen in FIG. 1, since there are three levels, i.e., the upper level 44 of heating chambers 24, the intermediate level 46, and the lower level 48, feeding chambers 24, each of the levels 44, 46, and 48 would be provided with its own exhaust manifold 36, exhaust line 38, and exhaust conveying line 40, in order to convey the exhaust from the three sets of heating chambers into the cyclones. Therefore, as seen in FIG. 1, there are three separate exhaust lines 40, feeding into the cyclones, for the very reason that each of the three levels of heating chambers has its own exhaust line.

Returning to the function of the cyclones 42, cyclones 42 would be the standard type of cyclone separator wherein any materials contained within vapors in vapor line 40 would be dropped into the lower cone portion 43 of cyclone 42, and would be conveyed via lines 45 into the hopper 14, for moving of the solids back through the system that had not yet been removed. The vapors would then move into vapor transport lines 50 for additional processing, as it will be discussed further.

Returning now to the movement of the waste materials through the heating chambers 24, after the solids have moved through the first level of chambers 44, and the vapors had been removed into exhaust manifold 36, the solids upon reaching the end portion 29 of heating chamber 24, would then be gravity fed into the next level of heating chambers 46, and would be conveyed in the direction of arrows 47, as seen in FIG. 1, in the second path in the direction of arrow 47, the material would vaporize at a temperature between 300° F. to 900° F. That is, any remaining water and liquid hydrocarbons, which are those hydrocarbons which are liquid at normal atmospheric conditions, for example, gasoline and oil would then be removed through vaporization. These vapors would likewise follow the same path from the second set of heating chambers 46, into the cyclone separators via vapor lines 45 as was discussed earlier.

Following the movement of the waste material through the second layer of chambers 46, the materials upon reaching the end 31 of second layer of chambers 46, would then be gravity fed into the third level 48 of chambers 24, and would then be conveyed in the direction of arrows 49 to the end 33 of these particular chambers. The third and final pass through the third chambers 24 would be to remove those materials which are heated to between 1200° F. and 700° F., would vaporize the remaining heavy hydrocarbons and other volatiles. For example, solid hydrocarbon that may be removed may be asphalt or paraffin tars depending on the pressure or the temperature that would be reached within the heating chamber.

Following the passing of the waste material through the third chamber, the solid waste upon reaching the end 33 of the third level of chambers 48, would then be conveyed via transverse auger 51, and would be removed from the system for dumping or storage.

Figure 2:
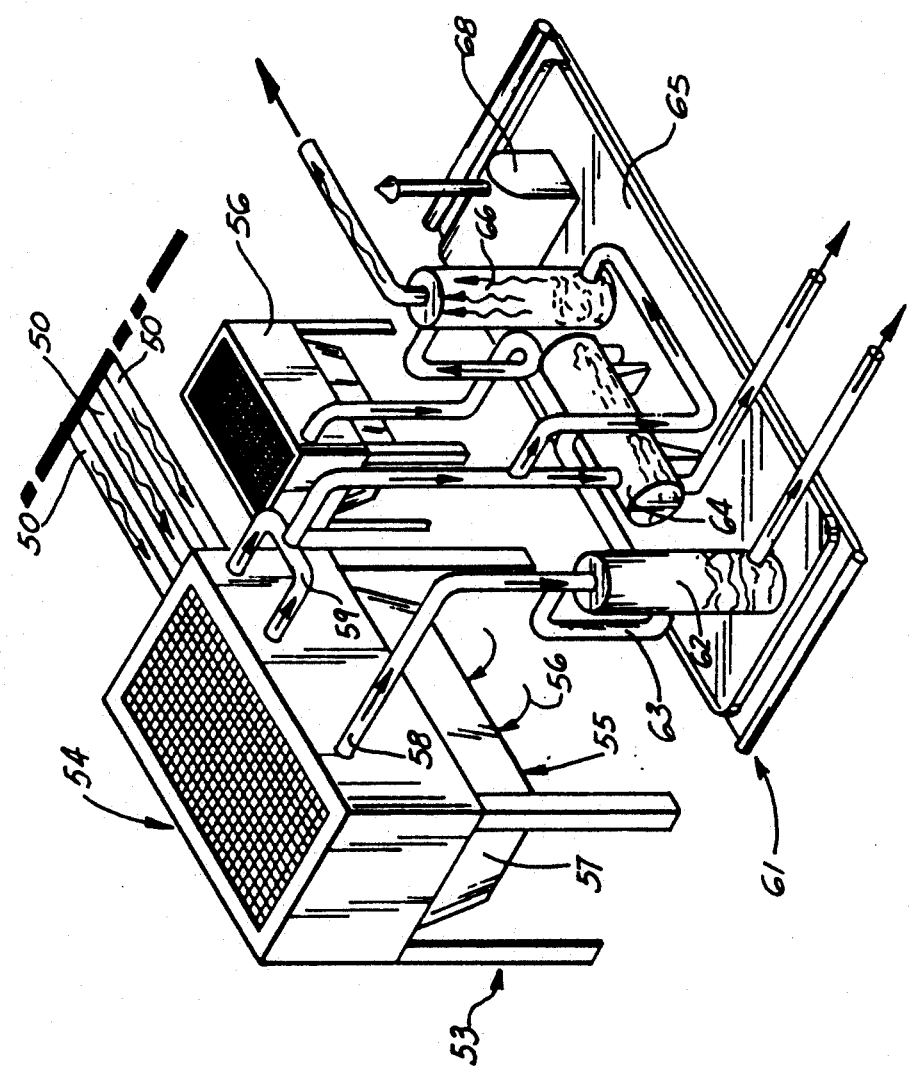
FIG. 2 is an overall view of the air coolers and distillation portion of the preferred embodiment of the system of the present invention.

Reference is now made to that portion of the system for treating the vapors that have been received from the individual heating chambers 24, into vapor manifold 36, routed to separator cyclones 42 for removal of the solids, and have entered line 50 towards the means for treating the vapors, as seen in FIG. 2.

The process by which the hydrocarbon gases in lines 50 are cooled and condensed would be through the utilization of an air cooling means 54 which comprises substantially three air coolers for receiving the vapors from lines 50, so as to cool the hot vapors down to 120° F. or 220° F. The remaining portion of the stream comprises the carrier gas, i.e., the inert gas such as nitrogen gas. For purposes of the preferred embodiment, the air coolers would comprise a plurality of pipes through which outside air 56 is blown in via fans 55 through the bottom 57 of the air cooling chamber 54, and the air in effect would surround the plurality of pipes through which the vapors are travelling via lines 50, and would cool the vapors therein, for exiting the air cooling chamber 54, via lines 58 and 59.

In order to achieve economics of scale, the gas stream leaving the air cooler via lines 58 and 59 would usually be combined with the gas stream from other parallel distillation trains for further processing. The first step in this portion of the process is the three phase separator or the water phase and the oil phase covered from the gas phase. As seen in FIG. 2, there is provided a first hot two phase separator 62, wherein the oil and gas mixture is boiled, and the water is distilled via line 63 into a three phase separator 64. The oil is then collected via line 65 for resale. The vapors would then move into three phase separator 64, for further distillation. The gas phase would proceed to two parallel gas compressors which raises the pressure to 100-125 psi. The gas stream goes through an additional air cooler 56, to a cold two phase separator 66 wherein additional liquids are separated. The gas stream would then next move to a dryer to remove water into a refrigeration unit. The distillation unit 62 and 64 are heated via a steam generating unit 68.

In the initial paths through the first chamber, the waste materials would be heated to a temperature optimally between 212 degrees F. to 350 degrees F., which would vaporize water and light those hydrocarbons which boil at low temperatures, or in this case, less than 212 degrees F., the boiling point of water.

In the second paths of the material through the second chambers, those waste materials which would vaporize at a temperature between 300 degrees F. to 900 degrees F., would be volatized, that is any remaining water and liquid hydrocarbons, which are those hydrocarbons which are liquid at normal atmosphere conditions, for example gasoline and oil.

The third and final paths through the third chambers, would be those materials which are heated up between 1200 degrees F. and 1700 degrees F., which would vaporize the remaining heavier hydrocarbons and other volatiles. For example such a solid hydrocarbon may be asphalt or parafin tars depending on the pressure or the temperature.

Following the passing of the waste material through the third chamber, through which the materials are heated to 1700 degrees F., the hot volatized gases from each of the three chambers would be cooled and condensed in order to recover any water, oil, or liquid petroleum gas. The process by which the hot gases are cooled and condensed would be the utilization of three air coolers per chamber, in order to cool the hot vapors down to 120 degrees F. or 220 degrees F. The remaining portion of the stream would be mostly the carrier gas i.e., inert nitrogen gas. For purposes of the preferred embodiment, the air coolers would utilize outside air to cool the gases as opposed to the cooling water. The gas stream next goes through the dryer to remove water and then a refrigeration unit.

The movement of the gas stream into the refrigeration unit may allow additional hydrocarbons to be recovered at this point. The gas stream is analyzed for hydrocarbons with a certain portion being purged to a flare. Then fresh nitrogen is added to replace losses and the stream is now ready to recycle to the units.

In the preferred embodiment of the process, the distillation process would be designed to process substantially 88 tons per day of filter pressed generated waste, as discussed earlier. Estimated affluent yields in the preferred embodiment are foreseen as follows:

| | |
|---|---|
| Inert solids | 31 Tons Per Day |
| Water | 250 Barrels Per Day |
| Oil | 80 Barrels Per Day |
| Liquid Petroleum Gas (LPG) | 108 Barrels Per Day |
| Non-Condensable Hydrocarbons Gases (Methane or Ethane) | 190 Pounds Per Day |

In the embodiment which includes equally spaced injection ports in each of the three chambers, which would mean a total of 18 injection points per train i.e., each of the nine chambers having two injection points each.

For purposes of instruction, as illustrated, heating chamber assembly 10 would be set upon a skid 13, so that it may be positioned on a rig or the like during use quite efficiently, and due to its unique construction of the stacking of the chambers, occupy less space than would normally be utilized. Furthermore, as illustrated the unit is powered by an electrical power source 15, which would supply the electrical heating elements in each of the heating chambers in order to heat the chambers to the desired temperature. Furthermore, as illustrated in FIG. 2, the vapors are processed through line 50 from the heating chambers, which include the air cooling unit 53 which comprises the air coolers 54 and 56, and the distillation skid 61, which like the heating chambers is also provided on a movable skid 65 so that the unit may be again easily moved and set up on site.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

TABLE A

RESULTS OF B.D.A.T. TESTING OF API SEPARATOR SLUDGE BEFORE AND AFTER T.D.I. THERMAL DISTILLATION TREATMENT

| TCLP: PARAMETER | CONCENTRATION (ppm) | | |
|---|---|---|---|
| | API No. 1 SLUDGE | TDI TREATED | B.D.A.T. CRITERIA |
| As | 0.013* | 0.020* | 0.004 |
| Cr | 0.08 | 0.11 | 1.7 |
| NL | 0.07* | <0.03 | 0.048 |
| Se | <0.005 | <0.005 | 0.025 |
| TOTAL CONST. | | | |
| CN | <0.25 | <0.25 | 1.8 |
| Anthracene | <33.0*? | <0.33 | 6.2 |
| Benzene | <1000*? | <10.0*? | 9.5 |
| Benzo(a)anthracene | <33.0*? | <0.33 | 1.4 |
| Benzo(a)pyrene | <33.0*? | <0.33 | 0.84 |
| Bis(2-ethylhexyl) phthalate | <33.0 | <0.33 | 37.0 |
| Ethyl benzene | <1000*? | <10.0 | 67.0 |
| Toluene | <1000*? | <10.0*? | 9.5 |
| Chrysene | <33.0*? | <0.33 | 2.2 |
| Xylene | <1000 | <10.0 | reserved |
| Di-N-Butyl Phthalate | <33.0*? | <0.33 | 4.2 |
| Napthalene | <38.0 | <0.33 | reserved |
| o-Cresol | <33.0*? | <0.33 | 2.2 |
| p-Cresol | <33.0*? | <0.33 | 0.9 |
| Phenanthrene | <33.0*? | <0.33 | 7.7 |
| Phenol | <33.0*? | <0.33 | 2.7 |
| Pyrene | <33.0*? | <0.33 | 2.0 |

* Denotes B.D.A.T. criteria
? Denotes detection limit too high to be conclusive
(Note: For untreated API Sludge sample, detection limit was so high for volatiles due to masking by extremely high conc. of MEC, detection limit high on semi-volatiles due to masking Napthalene.)

What is claimed as invention is:

1. A process for vaporizing compounds in a hydrocarbon-containing waste stream, through heat retention, the process comprising the following steps:
    a) introducing a waste stream containing solids into a cylindrical chamber and maintaining the cylindrical chamber at a pre-determined temperature;
    b) conveying the waste stream through the cylinder for a time sufficient for compounds having an evaporation point of at least 80 degrees F. to evaporate from the stream;
    c) conveying the evaporated stream via an inert gas medium through an air cooler;
    d) gravity feeding the remainder of the waste stream to a second, separate chamber; maintaining the second chamber at a second, pre-determined temperature; retaining the remainder of the waste stream in the second chamber for a certain amount of time so that compounds with evaporation point of between 300° F. to 900° F. are evaporated from the stream; gravity feeding the remainder of the waste stream to a third, separate chamber; maintaining the third chamber at a third, pre-determined temperature; retaining the remainder of the waste stream in the third chamber for a certain amount of time so that compounds with an evaporation point of between 900° F. and 1700° F. are evaporated from the stream;
    e) conveying the evaporated streams from the first chamber, second chamber, and third chamber, via an inert gas medium for removal of additional solids within the streams;
    f) processing the gas stream to remove condensible materials; and
    g) recycling the inert gas containing stream to the cylindrical chamber.

2. The process of claim 1, wherein the materials that have not been vaporized out of the stream are conveyed out of the chamber as inert solids for disposal.

3. A process for recovering volatile compounds from a hydrocarbon-containing waste stream, through heat retention, the process comprising the following steps:
    a) introducing a feed waste stream containing solids into a chamber and maintaining the chamber at a pre-determined temperature;
    b) conveying the waste stream through the chamber for a certain amount of time so that compounds with an evaporation point of 80 degrees F. are evaporated from the stream;
    c) conveying the evaporated stream via an inert gas medium through an air cooler;
    d) gravity feeding the remainder of the waste stream to a second, separate chamber; maintaining the second chamber at a second, pre-determined temperature; retaining the remainder of the waste stream in the second chamber for a certain amount of time so that compounds with evaporation point of between 300° F. to 900° F. are evaporated from the stream; gravity feeding the remainder of the waste stream to a third, separate chamber; maintaining the third chamber at a third, pre-determined temperature; retaining the remainder of the waste stream in the third chamber for a certain amount of time so that compounds with an evaporation point of between 900° F. and 1700° F. are evaporated from the stream;
    e) conveying the evaporated streams from the first chamber, second chamber, and third chamber, via an inert gas medium for removal of additional solids within the streams;
    f) condensing the evaporated streams; and
    g) collecting the components thereof.

4. The process of claim 3, wherein subsequent to step f) oil is removed from the stream by a distillation unit.

5. The process of claim 3, wherein the materials that have not been vaporized out of the stream are conveyed out of the chamber as inert solids for disposal.

6. A process for removing and recovering volatilized components from a hydrocarbon containing waste stream containing solids in separate, multiple heat phase sections comprising:
    a) transporting the feed waste stream into the first heat phase section;
    b) injecting an inert carrier gas into said section subsequent to the introduction of the waste stream;
    c) heating the waste stream in said section at a predetermined temperature and given time, in order to gasify compounds volatile at said temperature;
    d) removing the inert gas containing entrained gasified compounds from the waste stream;

e) gravity feeding the remainder of the waste stream to a second, separate section; maintaining the second section at a second, pre-determined temperature; retaining the remainder of the waste stream in the second section for a certain amount of time so that compounds with evaporation point of between 300° F. to 900° F. are evaporated from the stream; gravity feeding the remainder of the waste stream to a third, separate section; maintaining the third section at a third, pre-determined temperature; retaining the remainder of the waste stream in the third section for a certain amount of time so that compounds with an evaporation point of between 900° F. and 1700° F. are evaporated from the stream;

f) transforming the inert gas removed from the waste stream in step d) into separate liquid and gaseous forms; and g) collecting the remaining solids from the process.

7. The process of claim 6, wherein the inert carrier gas is a non-combustible gas selected from the group consisting of nitrogen and carbon dioxide.

8. The process of claim 6, wherein those compounds removed with the inert gas in step (d) from the first section evaporate in the range of 80° F. to 300° F.

9. The process of claim 8, wherein the compounds removed from the waste stream in the first section includes water and light hydrocarbons.

10. The process of claim 6, wherein the waste stream in the second section is heated to a temperature of between 300° F. and 900° F.

11. The process of claim 10, wherein the compounds removed from the waste stream in the second section include heavy hydrocarbons and creosote.

12. The process of claim 6, wherein the waste stream in the third section is heated to a temperature of between 900° F. and 1,700° F.

13. The process of claim 12, wherein the compounds removed from the waste stream in the third section include asphaltenes, PCB's and paraffinic tars.

14. The process of claim 6, wherein the materials that have not been vaporized out of the stream are conveyed out of the last section of said multiple heat phase sections as inert solids for disposal.

15. The process of claim 6, wherein subsequent to step d) the waste stream is introduced into a separator for removal of solids.

16. The process of claim 15, wherein the removed solids are reintroduced with the feed waste stream into said first heat phase section.

17. The process of claim 6, wherein said feed waste stream is waste from refining oil and natural gas.

18. The process of claim 6, wherein that portion of the feed waste stream which is not evaporated at the first section of said series of gravity fed into the second section.

19. The process of claim 18, wherein that portion of the feed waste stream which is not evaporated at the second section is gravity fed into the third section.

* * * * *